United States Patent

[11] 3,523,516

| | | |
|---|---|---|
| [72] | Inventor | Edwin A. Speaker<br>Brockport, New York |
| [21] | Appl. No. | 669,212 |
| [22] | Filed | Sept. 20, 1967 |
| [45] | Patented | Aug. 11, 1970 |
| [73] | Assignee | Bausch & Lomb Incorporated<br>Rochester, New York<br>a Corp. of New York |

[54] METER SCALE HAVING THEREON STRAIGHT LINE POSITIONING MARKINGS
8 Claims, 6 Drawing Figs.

[52] U.S. Cl.................................................. 116/129,
350/110
[51] Int. Cl...................................................... G01d13/02,
G12b 11/02
[50] Field of Search.................................. 116/129, K,C,E;
1/124.19, F,A,M,Q; 324/156; 350/110;
33/1d, 1h; 1/107, 75; 116/129K,C,E

[56] References Cited
UNITED STATES PATENTS

| | | | |
|---|---|---|---|
| 1,490,210 | 4/1924 | Hsieh ........................... | 116/129 |
| 2,163,183 | 6/1939 | Baagoe......................... | 116/129(F)UX |
| 2,254,242 | 9/1941 | Righi............................ | 116/129 |
| 2,520,758 | 8/1950 | Crownover.................. | 116/129(K)UX |

FOREIGN PATENTS

| | | | |
|---|---|---|---|
| 191,969 | 1/1923 | Great Britain............. | 33/148(E)UX |
| 358,159 | 4/1938 | Italy............................ | 116/129 |

Primary Examiner—Louis R. Prince
Assistant Examiner—Daniel M. Yasich
Attorney—Frank C. Parker and Charles C. Krawczyk ABSTRACT: The invention discloses improved meter scales for meter movements including an indicator that pivots over a predetermined angle of a sector. In one embodiment subdivision markings on the scales are positioned in straight lines to afford simpler readings and reduce angular observation errors. In other embodiments the scale is divided into three separate portions that are disposed about the chord of the sector. At least two of the three portions are straight line scales.

EDWIN A. SPEAKER
INVENTOR.

BY *Charles C. Krawczyk*

ATTORNEY

EDWIN A. SPEAKER
INVENTOR.

BY Charles C. Krawzzyk

ATTORNEY 3,523,516

METER SCALE HAVING THEREON STRAIGHT LINE POSITIONING MARKINGS

BACKGROUND OF THE INVENTION

This invention relates to meter scales.

The usual scale used with meters having a pivotal movement includes graduations or scale markings radially positioned along an arc of the angle of pivotal movement. The arced type of scale is difficult and unnatural to read since it does not present the normal reading situations i.e. horizontal and straight line concepts. The arced scale effectively presents two variables that change with respect to the usual horizontal orientation of an observer's eyes. One variable is the pivotal movement of the indicator. The other variable is angular change in the base line or centerline of the graduations over the curved scale. Since neither the scale graduation nor the indicator are constant, there is a general tendency for the observer to orientate the position of his eyes in accordance with the positions of the indicator, particularly at the extreme ends of the scale.

SUMMARY OF THE INVENTION

The meter scales of the invention reduce the amount of observer reorientation by positioning markings on the meter scales in straight lines providing a more natural reading situation.

In a first embodiment of the invention the major division markers are positioned in radial relation along an arc. The subdivision markers, which take the form of dots, are positioned in straight lines between each set of markers, with the lines between the markers displaced in a step fashion to generally follow the form of the arc.

In a second embodiment of the invention a first straight scale portion is positioned centrally within the sector of pivotal movement and in parallel relation to the major sector chord. A plurality of substantially shorter scale portions are positioned on opposite ends of the scale and are displaced away from the first scale portion toward the indicator pivot point so that the indicator provides a continuous reading as it sequentially moves from a shorter scale portion to the first scale portion and then to another shorter scale portion.

In a third embodiment of the invention the center portion of the scale remains in the form of an arc while a plurality of end portions of the scale are straight lines displaced from the center portion toward the pivot point.

DESCRIPTION OF THE PREFERRED EMBODIMENTS

Figure 1:
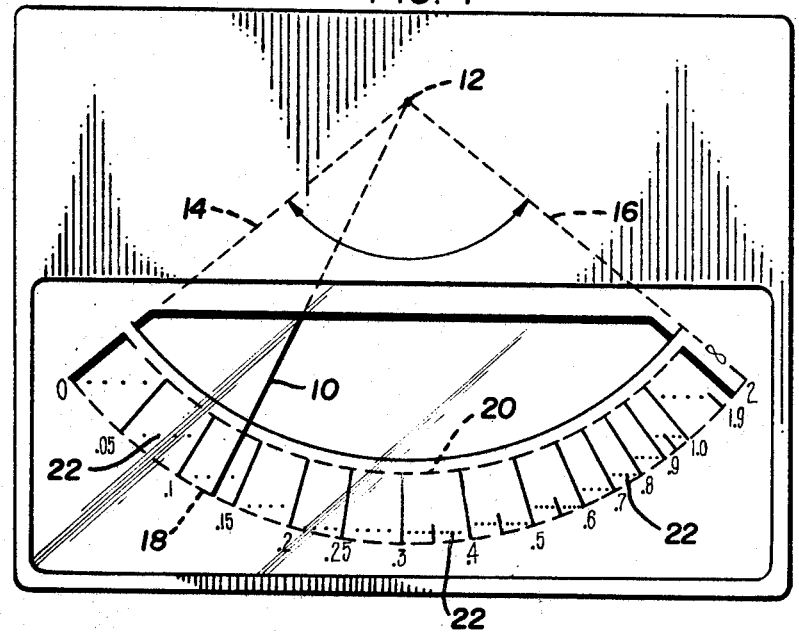
FIGURE 1 is a first embodiment of the meter scale of the invention including major scale markers located in radial relation and with subdivision markers positioned therebetween in straight lines.

The meter scale of FIGURE 1 provides calibrated indicia for the movement of a meter indicator 10. The indicator 10 is mounted for pivotal movement about a pivot point 12. The movement of the indicator 10 describes a sector defined by the radii 14 and 16 and the arc 18. The major divisional markers on the meter scale (designated with numerals) extend radially from an arc 20 within the sector. The subdivision graduations or markers 22 take the form of dots aligned in straight lines between the major markers. The straight lines including the subdivision graduations are displaced with respect to the straight lines of the neighboring subdivision graduations in a step type fashion between the two arcs 18 and 20 to generally follow the contour of the arcs.

It has been found that the straight line subdivision graduations provide a marked improvement in the ease by which the meter scale can be read. The observer can readily interpret the readings between the major scale markers by directly facing the meter scale. There is no need for tilting the observer's head in accordance to the angular setting of the indicator for interpolating the subdivision readings.

Figure 2:
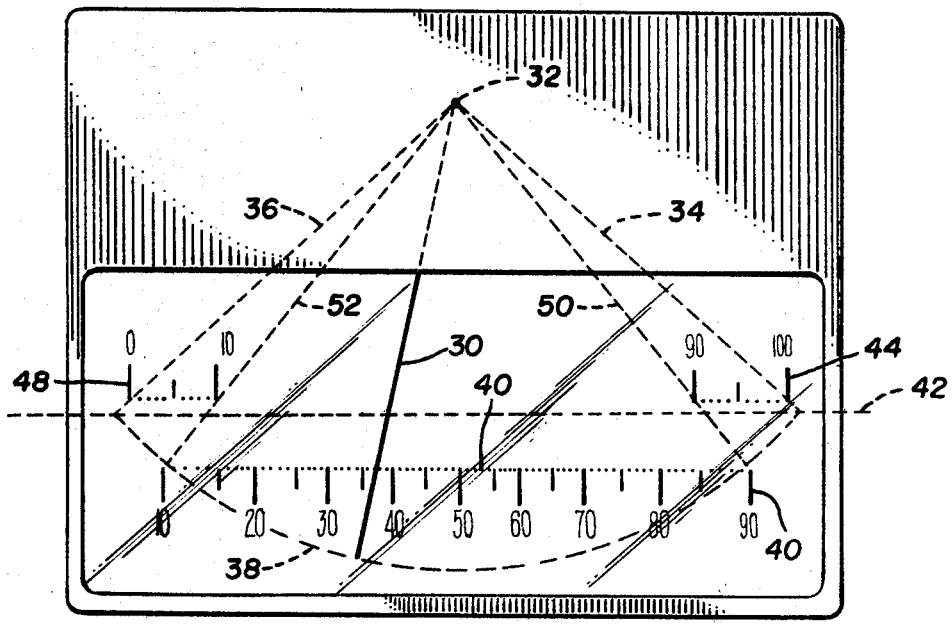
FIGURE 2 is a second embodiment of the meter scale of the invention including three displaced straight scale portions.

The meter scale of FIGURE 2 provides straight line calibrated indicia for a meter indicator 30. The indicator 30 is mounted for pivotal movement about a pivot point 32. The movement of the indicator 30 describes a sector defined by the radii 34 and 36 and the arc 38. The meter scale includes a first elongated straight portion 40 centrally located within the sector and beyond the major or longest chord 42 of the sector. The major divisional markers take the form of lines while the subdivision markers are either dots (or shorter lines as in FIGURE 3). Two substantially shorter scale portions 44 and 48 are positioned in substantially parallel relation to the first scale portion 40 and at opposite ends of the first scale portion. The position of the inner ends of the scale portions 44 and 48 is determined by the dashed radii 50 and 52. As illustrated, the inner ends of the scale portions 44 and 48 fall on straight lines (radii 50 and 52) drawn from the ends of scale portion 40 to the pivot point 32. Accordingly, as the indicator 30 moves from the radius 36 to the radius 34, a continuous reading is provided from the scale portion 48, to the scale portion 40 and then to the scale portion 44.

The meter scale of FIGURE 2 has the advantage of having all the markers set along a straight line for observation without the need for tilting the observers head. The use of the two end portions provides for the expansion of the scale at the extremes of the scale, thereby providing greater reading accuracy at the ends of the scale. This is particularly useful with logarithmic scales such as the embodiments of FIGURES 4 and 5 wherein the higher readings become progressively crowded. The scale expansion can be readily observed by comparing the length of the end portions 44 and 48 and the ends of the center scale 40 with corresponding portions of the arc 38 as best shown in FIGURE 2. The linear scale portions can be considered to lie on the hypotenuse of a triangle including the corresponding portion of the arc 38 and the portion of the radius therebetween. The greatest overall scale length is achieved when the markers of the scale portions 44 and 48 are aligned with the chord of the sector 42. Although the scale portions have been illustrated as having their ends aligned with the radii 50 and 52, the scale portions can be modified to extend beyond the radii and provide an overlapping effect in the scales as illustrated in FIGURE 3, as long as the corresponding scale markers fall along the same radii.

Figure 3:
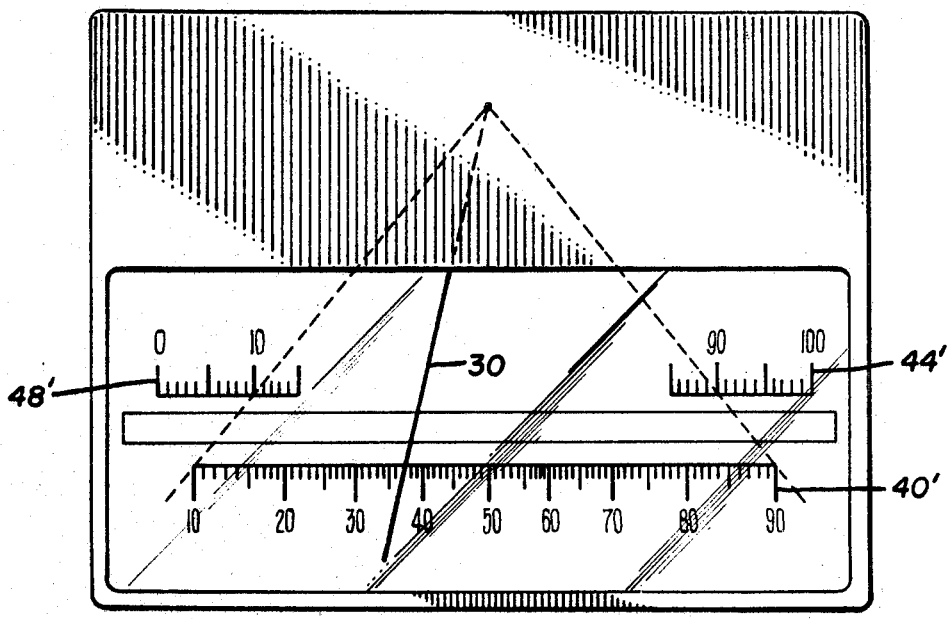
FIGURE 3 is a modification of the meter scale of FIGURE 2 including straight line subdivision markers.
Figure 4:
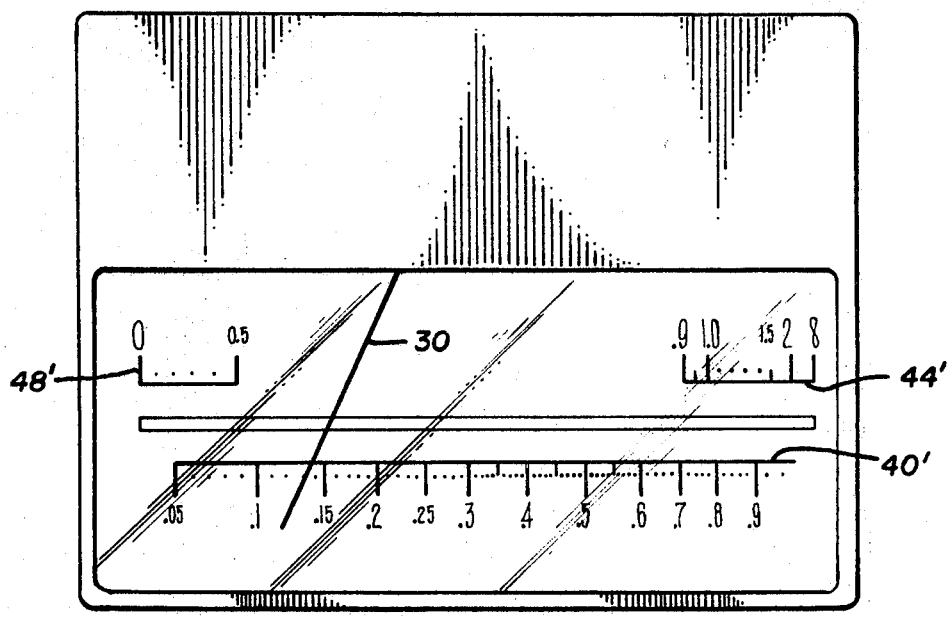
FIGURE 4 is a modification of the meter scale of FIGURE 2 including a logarithmic scale.
Figure 5:
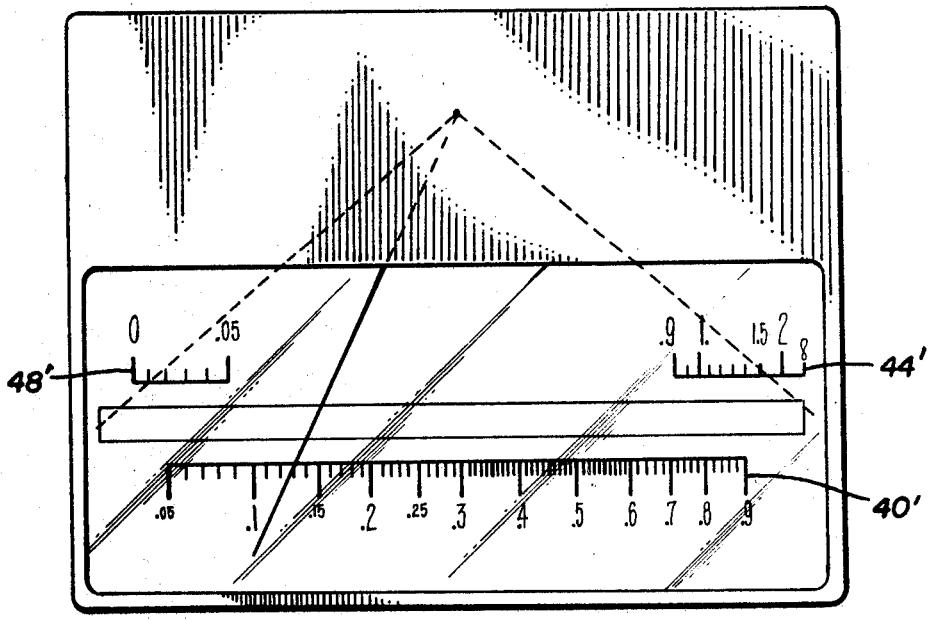
FIGURE 5 is a modification of the meter scale of FIGURE 4 including straight line subdivision markers.

The embodiment of FIGURES 3, 4 and 5 are similar to that of FIGURE 2 and therefore the same components are designated by the same reference numerals. The subdivision markers of the scales 40', 44' and 48' of FIGURE 3 are short lines rather than the dots of FIGURE 2 and the scale portions 44' and 48' have been extended to provide an overlapping effect. The scale portions 40', 44' and 48' of FIGURES 4 and 5 are illustrated with logarithmically spaced markers. In FIGURE 4 the subdivision markers are generally illustrated with dots while in FIGURE 5 the subdivision markers are with short straight lines. The use of the dots provide for a greater contrast between the background and the division markers.

Figure 6:
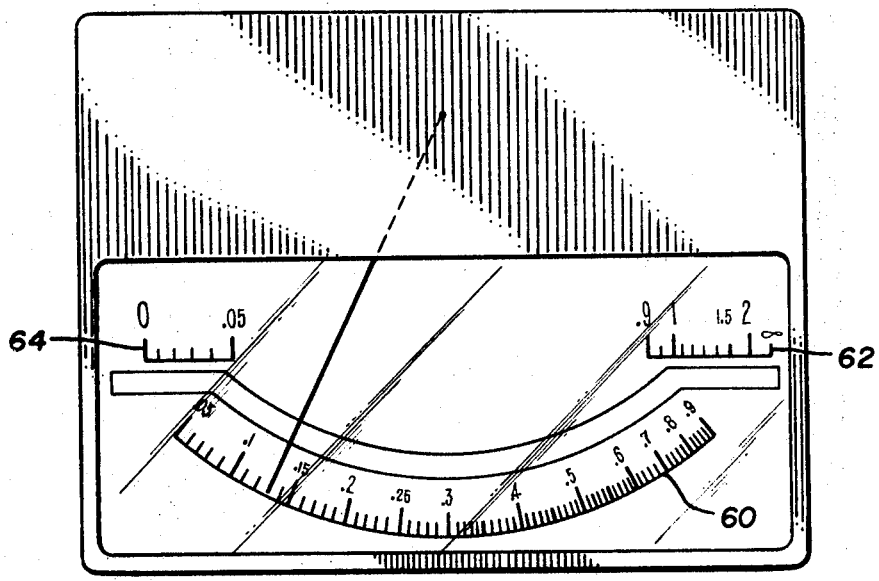
FIGURE 6 is a third embodiment of the meter scale of the invention including a curved central portion and two straight line end portions displaced from the center portion.

It should be noted that the length of the arc 38 of FIGURE 2 between the radii 50 and 52 is longer than the corresponding portion of the scale 40. In the straight scale portion 40, the scale markings are expanded at the ends as previously mentioned and also compressed at the center. This expansion and compression of the meter scale can be eliminated by including an arced center portion 60 and straight end portions 62 and 64 as illustrated in the logarithmic scale of FIGURE 6. It should be noted that most of the center scale 60 does not deviate greatly from a straight line and therefore can be readily observed without reorientation of the observers head. The tendency for reorientation increases at the ends of a curved scale. This portion of the scale has been substituted for by the straight end portions 62 and 64. This combination has the advantage of the curved scale (no compression in the central portion) with the advantages of the straight line end portions of expansion at the ends where needed, such as in the logarithmic scales.

I claim:

1. A meter scale for a meter movement including an indicator mounted for pivotal movement over a predetermined angle about a pivot point defining a sector of movement comprising:
   a first substantially straight scale portion mounted substantially centrally within said sector, and
   a plurality of substantially straight scale portions substantially shorter than said first scale portion mounted near the ends of said first scale portion in substantially parallel relation with said first scale portion and displaced from first scale portion towards said pivot point.

2. A meter scale as defined in Claim 1 wherein:
   said plurality of scale portions comprises two scale portions, one for each end of said first scale portion, and
   opposite ends of said two scale portions are positioned along a line from said pivot point to the ends of said first scale portion.

3. A meter scale as defined in Claim 2 wherein:
   said two scale portions are mounted along the major chord of the sector of movement.

4. A meter scale as defined in Claim 3 wherein:
   one of said two scale portions includes indicia corresponding to the lowest readings on said meter scale,
   said other one of said two scale portions includes indicia corresponding to the highest readings on said meter scale, and
   said first scale portion includes an indicia intermediate to said two scale portions.

5. A meter scale as defined in Claim 3 wherein said indicia on said first scale portion and said two scale portions are logarithmically arranged.

6. A meter scale for a meter movement including an indicator pivotally mounted for movement over a predetermined angle defining a sector of movement comprising:
   a first straight scale portion shorter than the major chord of said sector including division markers thereon positioned in substantially parallel relation to and beyond said chord with opposite ends of said scale portion positioned near the arc of said sector, and
   a plurality of straight scale portions substantially shorter than said first scale portion including divisional markers thereon positioned at opposite ends of said first scale portion in substantially parallel relation to said first scale portion along said chord.

7. A meter scale as defined in Claim 6 wherein:
   said plurality of scale portions comprises two scale portions, one for each end of said first scale portion, and
   opposite ends of said two scale portions and said first scale portion are positioned along a radius of said sector so that said indicator when pivoted over said sector, provides a continuous reading from one of said two scale portions to said first scale portion and then to the other of said scale portions.

8. A meter scale for use with a meter movement including an indicator that pivots over a predetermined sector comprising:
   a first straight scale portion including scale markings thereon positioned centrally within said sector in parallel relation to the sector chord, and
   second and third scale portions having scale markings thereon and being substantially shorter said first straight scale portion positioned adjacent the ends of said first scale portion and displaced therefrom so that said indicator as it pivots over said predetermined sector provides a continuous reading sequentially from said second, first and third scale portions.